US008170011B2

(12) United States Patent
Wilson

(10) Patent No.: US 8,170,011 B2
(45) Date of Patent: May 1, 2012

(54) SYSTEM AND METHOD FOR ALLOCATING PACKET IDENTIFIERS IN A TRANSPORT STREAM IN A SUBSCRIBER NETWORK

(75) Inventor: Thomas C. Wilson, Duluth, GA (US)

(73) Assignee: Cisco Technology, Inc., San Jose, CA (US)

(*) Notice: Subject to any disclaimer, the term of this patent is extended or adjusted under 35 U.S.C. 154(b) by 579 days.

(21) Appl. No.: 12/367,884

(22) Filed: Feb. 9, 2009

(65) Prior Publication Data

US 2009/0144794 A1 Jun. 4, 2009

Related U.S. Application Data

(63) Continuation of application No. 09/874,662, filed on Jun. 4, 2001, now Pat. No. 7,496,092.

(51) Int. Cl.
*H04L 12/28* (2006.01)

(52) U.S. Cl. .......................... 370/389; 370/486

(58) Field of Classification Search .................. 370/389, 370/465, 473, 474, 486, 487, 490
See application file for complete search history.

(56) References Cited

U.S. PATENT DOCUMENTS

| 5,420,866 A * | 5/1995 | Wasilewski ................... 370/426 |
| 5,477,263 A * | 12/1995 | O'Callaghan et al. ........ 725/102 |
| 5,619,337 A * | 4/1997 | Naimpally ................... 386/329 |
| 5,899,578 A * | 5/1999 | Yanagihara et al. .......... 386/239 |
| 6,219,358 B1 * | 4/2001 | Pinder et al. .................. 370/537 |
| 6,570,926 B1 * | 5/2003 | Agrawal et al. .......... 375/240.27 |
| 6,775,257 B1 * | 8/2004 | Watanabe ..................... 370/335 |
| 6,847,781 B1 * | 1/2005 | Sugimura et al. ............. 386/314 |
| 6,912,573 B2 * | 6/2005 | Ohkado et al. ................ 709/224 |
| 7,065,213 B2 * | 6/2006 | Pinder .......................... 380/240 |
| 7,496,092 B2 * | 2/2009 | Wilson .......................... 370/389 |

* cited by examiner

*Primary Examiner* — Ricky Ngo
*Assistant Examiner* — Christine Ng
(74) *Attorney, Agent, or Firm* — Tarolli, Sundheim, Covell & Tummino LLP

(57) ABSTRACT

An apparatus in a digital network includes the logic for allocating and assigning packet identifiers (PIDs) to digital packets, such as MPEG packets. The logic can reside in a device that transmits a transport stream or a device that controls a transport stream transmitter. In the preferred embodiment, a session number is associated a program and with an output port of a transport stream transmitter; and the session number is unique for that output port. The logic associates a PID from a set of allocated PIDs with the session number. The set of allocated PID values are PMT_PIDs, which are used for identifying the PMT packets, and the set of PMT_PIDs is scalable. In the preferred embodiment, the logic also associates the PMT_PID to the session number using a predetermined scheme. The apparatus also includes logic for assigning a set of PID values to the elementary streams of a program. In the preferred embodiment, number of PIDs assigned to the elementary streams of a program is no more than the number of elementary streams of the program.

30 Claims, 9 Drawing Sheets

SESSION TABLE 600

| 602 | 606 | 604 | 608 | 612 | 614 | 610 | 616 | 618 |
|---|---|---|---|---|---|---|---|---|
| INPUT PORT 402 | OUTPUT PORT 408 | PGM_NUM IN | PGM_NUM OUT | PMT_PID IN | PMT_PID OUT | SESSION INDEX | ECM_PID | PID POINTER |
| A | A | 1 | 16 | 16 | 100 | 1 | 600 | 256 |
| A | B | 1 | 1 | 16 | 100 | 1 | 600 | 256 |
| B | B | 50 | 2 | 800 | 101 | 2 | 601 | 264 |
| B | D | 25 | 25 | 400 | 102 | 3 | 602 | 128 |
| A | D | 10 | 50 | 160 | 109 | 10 | 609 | 512 |
| B | A | 5 | 25 | 80 | 103 | 4 | 603 | 530 |
| ⋮ | ⋮ | ⋮ | ⋮ | ⋮ | ⋮ | ⋮ | ⋮ | ⋮ |

| 602 | 606 | 604 | 608 | 612 | 614 | 610 | 616 | 618 |
|---|---|---|---|---|---|---|---|---|
| INPUT PORT 402 | OUTPUT PORT 408 | PGM_NUM IN | PGM_NUM OUT | PMT_PID IN | PMT_PID OUT | SESSION INDEX | ECM_PID | PID POINTER |
| A | A | 1 | 16 | 16 | 100 | 1 | 600 | 256 |
| A | B | 1 | 1 | 16 | 100 | 1 | 600 | 256 |
| B | B | 50 | 2 | 800 | 101 | 2 | 601 | 264 |
| B | D | 25 | 25 | 400 | 102 | 3 | 602 | 128 |
| A | D | 10 | 50 | 160 | 109 | 10 | 609 | 512 |
| B | A | 5 | 25 | 80 | 103 | 4 | 603 | 530 |
| ••• | ••• | ••• | ••• | ••• | ••• | ••• | ••• | ••• |

SESSION TABLE 600

SESSION NUMBER MAP 700

| OUTPUT PORT 408 | 1 | 2 | 3 | 4 | • • • | 500 |
|---|---|---|---|---|---|---|
| A | A | A | A | F | • • • | F |
| B | A | A | F | A | • • • | F |
| C | A | A | F | A | • • • | F |
| D | A | A | F | F | • • • | F |

FIG. 7

PID ALLOCATION MAP 800

| | Reserved 802 | | | | 804 | | | 806 | | | 808 | | 802 |
|---|---|---|---|---|---|---|---|---|---|---|---|---|---|
| OUTPUT PORT 408 | 0 | 1 | • • • | 99 | 100 | • • • | 599 | 600 | • • • | 1099 | 1100 | • • • | 8191 |
| A | R | R | • • • | R | R | • • • | R | R | • • • | R | A | • • • | R |
| B | R | R | • • • | R | R | • • • | R | R | • • • | R | A | • • • | R |
| C | R | R | • • • | R | R | • • • | R | R | • • • | R | A | • • • | R |
| D | R | R | • • • | R | R | • • • | R | R | • • • | R | F | • • • | R |

FIG. 8

| ADD/DELETE 1102 | INPUT PORT 1104 | PGM_IN NUM. 1106 | OUTPUT PORT 1108 | PGM_OUT NUM. 1110 | DATA 1112 |
|---|---|---|---|---|---|
| ADD | 402(A) | 10 | 408(A) | 510 | |

SYSTEM AND METHOD FOR ALLOCATING PACKET IDENTIFIERS IN A TRANSPORT STREAM IN A SUBSCRIBER NETWORK

This application is a continuation of U.S. application Ser. No. 09/874,662, filed Jun. 4, 2001, which is incorporated herein by reference in its entirety.

FIELD OF THE INVENTION

This invention relates generally to broadband communications systems, such as subscriber television systems and the equipment of the digital headend and hubs within such systems, and more specifically to multicasting digital packets within the broadband communication system.

BACKGROUND OF THE INVENTION

Frequently, broadband systems transmit television signals to subscribers of a conditional access system. Broadband systems, such as cable and satellite television systems, typically include a headend for receiving programming, or sessions, and/or data from various sources and redistributing the programming and other data through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links, as well as a network of distributed nodes that then transmit the programming to subscriber locations, or to a network of distributed hubs, which transmit the signals to subscriber equipment, or any combination thereof. In a cable television system, the subscriber equipment can include a cable-ready television, a cable-ready video cassette recorder (VCR), or a digital home communications terminal (DHCT) that is connected to a television, computer, or other display device.

Increasingly, the headend is receiving and transmitting programming in a digital format, for example, Moving Pictures Expert Group (MPEG) format, instead of an analog format. Transmitting programs in MPEG format is advantageous because multiple digitized programs can be combined and transmitted in, for example, 6 MHz of bandwidth, which is the same amount of bandwidth required to transmit a single analog channel or program.

MPEG transport streams include overhead information such as MPEG tables that indicate the types and location of the programming within the transport stream. In a local television system, the MPEG tables include information that is specific to that local distribution system and its particular channel line-up. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11 N (June 1996 for MPEG-1 and July 1996 for MPEG-2), which is hereby incorporated by reference. Therefore, the headend system, and the modulators in particular, must add the required MPEG table data to the outgoing bit stream.

MPEG transport streams are made up of standardized packets, each of which are 188 bytes in size. Each of the packets includes a header and a payload. Generally, the header is 4 bytes in size and the payload is 184 bytes in size, but the header can be expanded, in which case the payload is contracted by a corresponding amount. The header includes a packet identifier (PID), which is a 13-bit field that is used to identify the packet. Thus, 8,192 possible PID values can be assigned to packets in a transport stream. Certain PID values are reserved, such as PID=0 and PID=8,191, which are used to identify Program Association Tables (PAT) and stuffing packets, respectively, and will be described in greater detail hereinbelow.

Generally, a transport stream includes a plurality of elementary streams, and each elementary stream is made up of packets that have a common PID value that is different from the PID values of other elementary streams in the transport stream. An MPEG program is made up of a plurality of elementary streams. Generally, an MPEG program includes a video elementary stream, which is made up of packets having digitized video information included therein, and at least one audio elementary stream.

Generally, a transport stream includes a plurality of programs, each of which are uniquely identified by a program number. The transport stream includes a program association table (PAT) packet, which has the PID value of 0. The PAT of a transport stream maps program identities to their program number. A program corresponds to what has traditionally been called a channel, e.g., PBS, ESPN, etc. The PAT identifies the PID value of the elementary stream for the program map table (PMT) of a program included in the transport stream. A PMT for a program lists all of the PID values of the elementary streams of the program. Thus, the process of identifying a program and its contents takes place in two stages: first one uses the PAT in the PID=0 elementary stream to identify the PID of the elementary stream carrying the PMT for the program, and then in the next stage one obtains the PIDs of the elementary bit streams that make up the program from the appropriate PMT. A demultiplexer can be set to receive the identified packets that correspond to the program of interest. For proper viewing, the elementary streams must be synchronized so that the audio and video signals of the program correspond to each other.

Industry standards such as, American Television System Committee (ATSC), document A/54 ("Guide to the Use of ATSC Digital Television Standard"), which is hereby incorporated in its entirety by reference, limit the number of programs that can be included in a transport stream to 255, and the program numbers for the programs range from 1-255. Each program number is associated with a particular PMT, and the PMT has a pre-determined PID value. According to this standard, every 16.sup.th value is a PMT_PID. The next 15 PIDs after that PID value are reserved for elementary streams of that program and are not otherwise assigned. For example, the PMT_PID of program 1 is 16 and the PIDs 17-31 are reserved for elementary streams associated with program 1, the PMT_PID of program 2 is 32 and PIDs 33-47 are reserved for elementary streams associated with program 2, and so on and so forth. Thus, PIDs 16-4085 are allocated to programs 1-255, and the remaining PIDs are used for identifying other packets having content, such as, but not limited to, system management packets, audio packets, data packets and information downloaded from the internet.

The A/54 standard also specifies how certain PID values are assigned to particular elementary streams of the program. A PMT, which is associated with program number N, has a PID value of 16N, which is the base value used for defining PIDs for elementary streams associated with that program. Packets of video content are assigned to the PID value of (16N+1), as are program clock reference (PCR) packets, which are used for synchronizing the elementary streams of the program. In addition, a complete main audio channel, which includes all required voiceovers and emergency messages, is assigned the PID value of 16N+3.

The current method for allocating PIDs has several inherent flaws. Television programs can only be assigned program numbers from 1-255. As the bandwidth of cable television systems increase and as the number of channels increases, there exists a need for more than 255 program numbers. In addition, the current method wastes PID values. Each program is assigned 15 PID values, even when the program has less than 15 elementary streams. Furthermore, the current method cannot allow a program to have more than 15 elementary streams.

SUMMARY OF THE INVENTION

The present invention provides an apparatus and method for allocating packet identifiers (PIDs) to the digital packets of a transport stream transmitted from the apparatus. Although the transport streams of the preferred embodiment of the invention are described in terms of MPEG transport streams, it is to be understood that this is for exemplary purposes only, and that the preferred embodiment of the invention is not limited to MPEG transport streams. Accordingly, other conventional transport streams are included in the scope of the present invention.

Briefly described, in architecture, one embodiment of the system, among others, can be implemented as follows. An apparatus in a digital network includes a mechanism that assigns a session number to a session. The session is associated with a program that is included in a transport stream of the digital network. The apparatus includes a mechanism that assigns a PID, which is used for identifying the program map table (PMT) packet associated with the program, to the session. The apparatus also includes a mechanism for allocating a set of PID values to the elementary streams of the program.

The present invention can also be viewed as providing methods for allocating PIDs in a digital transport stream. In this regard, one embodiment of such a method, among others, can be broadly summarized by the following steps: assigning a session number to a session, which is associated with a program included in the digital transport stream. The session number is associated a PMT_PID value, which is used for identifying the PMT packet of the program. A set of PID values are assigned to the elementary streams of the program, and the PID values that are assigned to the elementary streams of the program are indicated in a map as being assigned.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIG. 7, is a table mapping session numbers per output port.

FIG. 8 is table mapping PIDs per output port.

DETAILED DESCRIPTION OF A PREFERRED EMBODIMENT

The preferred embodiment of the invention will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiments set forth herein; rather, the embodiments are provided so that this disclosure will be thorough and complete, and will fully convey the scope of the invention to those skilled in the art. All examples are intended to be non-limiting, with additional examples being included within the scope of the present invention.

In the preferred embodiment of the invention, given unlimited bandwidth, the number of programs that can be provided in a transport stream is scalable, instead of being arbitrarily set, and the number of PID values assigned to a program is related to the number of elementary streams associated with the program.

Television System Overview

The preferred embodiment of the invention is best understood within the context of a two-way, interactive digital subscriber television system, as an example. In this discussion, the two-way interactive digital subscriber television system is also referred to as a Digital Broadband Delivery System (DBDS). An overview of an exemplary DBDS is provided in U.S. Pat. No. 6,157,719, entitled "Conditional Access System", which is hereby incorporated by reference herein in its entirety. A function of the DBDS is to provide interfaces to content providers, entitlement agents, control access to and the use of the content, and to distribute the content to subscribers. The DBDS uses Motion Picture Experts Group (MPEG) transport streams for delivery of video, audio, and data entertainment programming. These can include, among others, programming and data information such as local television channels, premium movie channels, video-on-demand (VOD), telephone services, and Internet access.

Figure 1:
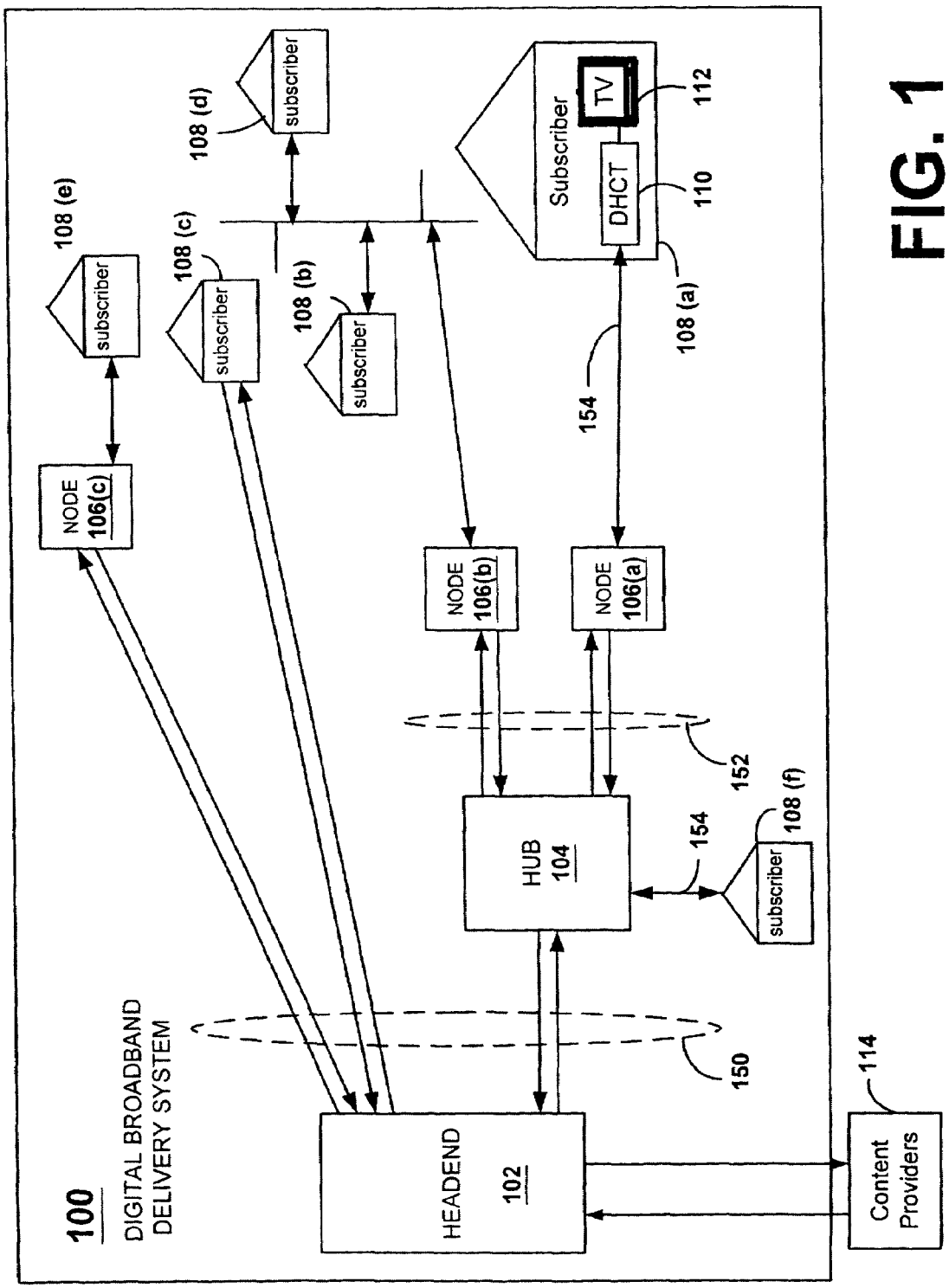
FIG. 1 is a broadband communications system, such as a cable television system, in which the preferred embodiment of the invention may be employed.

Referring now to FIG. 1, a digital broadband delivery system (DBDS) 100 includes a headend 102, a hub 104, multiple nodes 106, a plurality of subscriber locations 108, and a plurality of digital home communication terminals (DHCTs) 110. The headend 102 provides the interface between the DBDS 100 and content providers 114, such as broadcasters, Internet service providers, and the like. The transmission medium between the headend 102 and the content providers 114 can be two-way. This allows for two-way interactive services such as Internet accesses via DBDS 100.

Unlike the prior distribution systems, which have a main trunk and branches, the DBDS 100 includes a plurality of hubs 104 and nodes 106 that are in communication with the headend 102 via transmission medium 150. The headend 102 is in direct communication with the hubs 104, and can be in direct communication with some or all of the nodes 106 and with some or all of the subscriber locations 108. Whether the headend 102 communicates directly to nodes 106 and subscriber locations 108 is a matter of implementation.

The hub 104 receives programming and other information from headend 102 via transmission medium 150 and transmits information via transmission medium 152 to nodes 106 that are in direct communication with the node 106, which then transmit the information to subscriber locations 108 through transmission medium 154. The hub 104 also transmits information directly to subscriber locations 108 via transmission medium 154. Again, whether the hub 104 communicates directly to subscriber locations 108 or to nodes 106 is a matter of implementation.

In the preferred embodiment, the subscriber locations 108 are in direct or indirect two-way communication with the headend 102 or a hub 104. Typically, the transmission medium 150 and 152 are optical fibers that allow the distribution of high quality and high-speed signals. Typically, the transmission medium 154 is either broadband coaxial cable or optical fiber or other appropriate transmission medium known to those skilled in the art.

The hub 104 can also function as a mini-headend for the introduction of programming and data information to each sub-region of hub 104. For the purposes of this disclosure, a sub-region of hub 104 is defined as the portion of DBDS 100 that is directly or indirectly connected to hub 104. Having the hub 104 function as a mini-headend facilitates the introduction of different data information and programming to different sub-regions within the DBDS 100. For example, the subscriber location 108(*b*), which is connected to node 106(*b*), can have different data information and programming available than the data information and programming available to subscriber location 108(*c*), which is connected directly to headend 102, even though the subscriber locations 108(*b*) and 108(*c*) may be in close physical proximity to each other. Data information and programming for subscriber location 108(*b*) are routed through hub 104 and node 106(*b*), and hub 104 can introduce data information and programming into the DBDS 100 that are not available through the headend 102.

At the subscriber locations 108, a decoder or a DHCT 110 provides the two-way interface between the DBDS 100 and the subscriber. The DHCT 110 decodes the signals for display on a display device, such as a television set (TV) 112 or a computer monitor. Those skilled in the art will appreciate that in alternative embodiments the equipment for decoding the signal can be located in a variety of equipment, including, but not limited to, a DHCT, a computer, a TV, a monitor, or an MPEG decoder.

Figure 2:
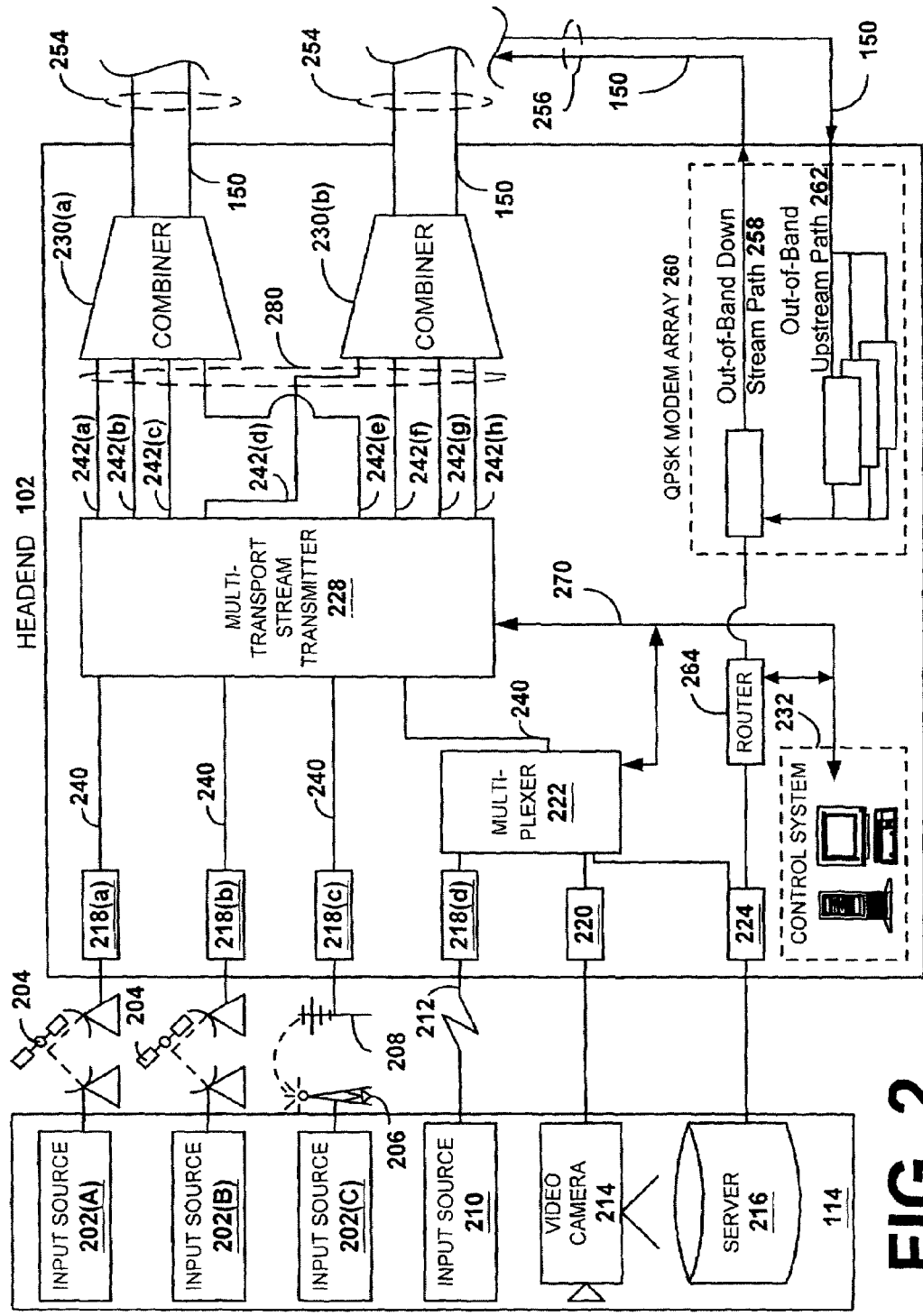
FIG. 2 is a headend in the broadband communication system in which the preferred embodiment of the invention may be employed.

Subscribers in the DBDS 100 can request services from the operators of the DBDS 100. Services provided to subscribers include, but are not limited to, television programming, pay-per-view services, such as, video-on-demand, and Internet access. Generally, the operator of the DBDS 100 creates a session for each of the services offered to subscribers. A session is a generalization of a conventional program and channel. For example, a session of unlimited duration can be thought of as a conventional channel having a series of programming. A limited duration session might be a single program, such as, for example, a Pay-Per-View program like a special sporting event. Sessions can also be user specific services. For example, when a user pauses a "live" television program, a session is created specifically for that user. The session provides the user with the programming content of the live program. A session can be thought of as generalized service that provides the user with a set of set elementary streams, and a conventional program that is included in the elementary streams can change. FIG. 2 is an overview of a headend 102, which provides the interface between the DBDS 100 and the content providers 114. The headend 102 receives content from a variety of content providers 114, which can provide input in a variety of ways. The headend 102 combines the content from the various sources and distributes the content either directly or indirectly to subscribers 108.

In a typical system, the programming, data information and other information from content providers 114 is received from a variety of input sources 202 and 210. The input signals may be transmitted from sources to the headend 102 via a variety of transmission paths, including satellites 204, and terrestrial broadcast transmitter and antenna, 206 and 208, respectively. The headend 102 can also receive content from a direct feed source 210 via a direct line 212. Other input sources from content providers 114 include a video camera 214 or an application server 216. The signals provided by the content or programming input sources can include a single program or a multiplex that includes several programs.

The headend 102 generally includes a plurality of receivers 218 that are each associated with a content source. MPEG encoders, such as encoder 220, are included for digitally encoding things such as local programming or a feed from video camera 214. The output signal from encoder 220 is a program stream that is input into multiplexer 222, which receives input signals from switch 224, receiver 218(D) and control system 232. The multiplexer 222 processes the input signals and multiplexes at least a portion of the input signals into transport stream 240.

The switch, such as asynchronous transfer mode (ATM) switch, 224 provides an interface to an application server 216. There can be multiple application servers 216 providing a variety of data information such as a Pay-Per-View service, including video on demand (VOD), a data service, an Internet service, a network system, or a telephone system. Content providers 114 may download content to an application server 216 located within the DBDS 100. The application server 216 may be located within headend 102 or elsewhere within DBDS 100, such as in a hub 104.

The various inputs into the headend 102 are then combined with the other information from the control system 232, which is specific to the DBDS 100, such as local programming and control information, which can include among other things conditional access information. The headend 102 also contains a multi-transport stream controller 228, which receives a plurality of transport streams 240 and transmits a plurality of transport streams 242. In the preferred embodiment, multi-transport stream controller 228 includes a plurality of modulators, such as, but not limited to, QAM modulators, that convert the received transport streams 240 into modulated output signals suitable for transmission over the transmission medium 280.

The output transport streams 242 from the transport stream controller 228 are combined, using equipment such as a combiner 230, for input into the transmission medium 150, and the combined signals are sent via the in-band delivery path 254 to the subscriber locations 108. In the preferred embodiment of the DBDS 100, video, audio, and control information are encoded as program streams, which are then multiplexed to form transport streams 240, and each output transport stream 242 is modulated to a set frequency. For the DHCT 110 (shown in FIG. 1) to receive a television program, the DHCT 110 must tune to the frequency associated with the modulated transport stream that contains the desired information, de-multiplex the transport stream, and decode the appropriate program streams.

The control system 232, which preferably includes computer hardware and software providing the functions discussed herein below, allows the television system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, conditional access for the content distributed to subscribers, and initiating, managing and ending sessions. Information, such as conditional access information, is communicated from the control system 232 to multiplexer 222, where it is multiplexed into transport stream 240. Among other things, the control system 232 provides input to the multi-transport stream controller 228 for setting their operating parameters, such as selecting certain programs or portions of transport streams 240 for inclusion in one or more output transport stream 242, and/or providing conditional access information. Control information and other data can be communicated to hubs 104 and DHCTs 110 via an in-band delivery path 254 or via an out-of-band delivery path 256. The out-of-band data is transmitted via the out-of-band downstream path 258 of transmission medium 150 by means such as, but not limited to, a Quadrature Phase-Shift Keying (QPSK) modem array 260. Two-way communication utilizes the upstream portion 262 of the out-of-band delivery system 256. Hubs 104 and DHCTs 1110 transmit out-of-band data through the transmission medium 150, and the out-of-band data is received in headend 102 via out-of-band upstream paths 262. The out-of-band data is routed through router 264 to an application server 216 or to control system 232. The out-of-band control information includes such information as a pay-per-view purchase instruction and a pause viewing command from the subscriber location 108 (shown in FIG. 1) to a video-on-demand type application server 216.

The control system 232, such as Scientific-Atlanta's Digital Network Control System (DNCS), without limitation, also monitors, controls, and coordinates communications in the DBDS 100, including video, audio, and data. The control system 232 can be located at headend 102 or remotely.

The transmission medium 150 distributes signals from the headend 102 to the other elements in the subscriber television system, such as a hub 104, a node 106, and subscriber locations 108 (shown in FIG. 1). The transmission medium 150 can incorporate one or more of a variety of media, such as optical fiber, coaxial cable, and hybrid fiber-coax (HFC), satellite, direct broadcast, or other transmission media.

Figure 3:
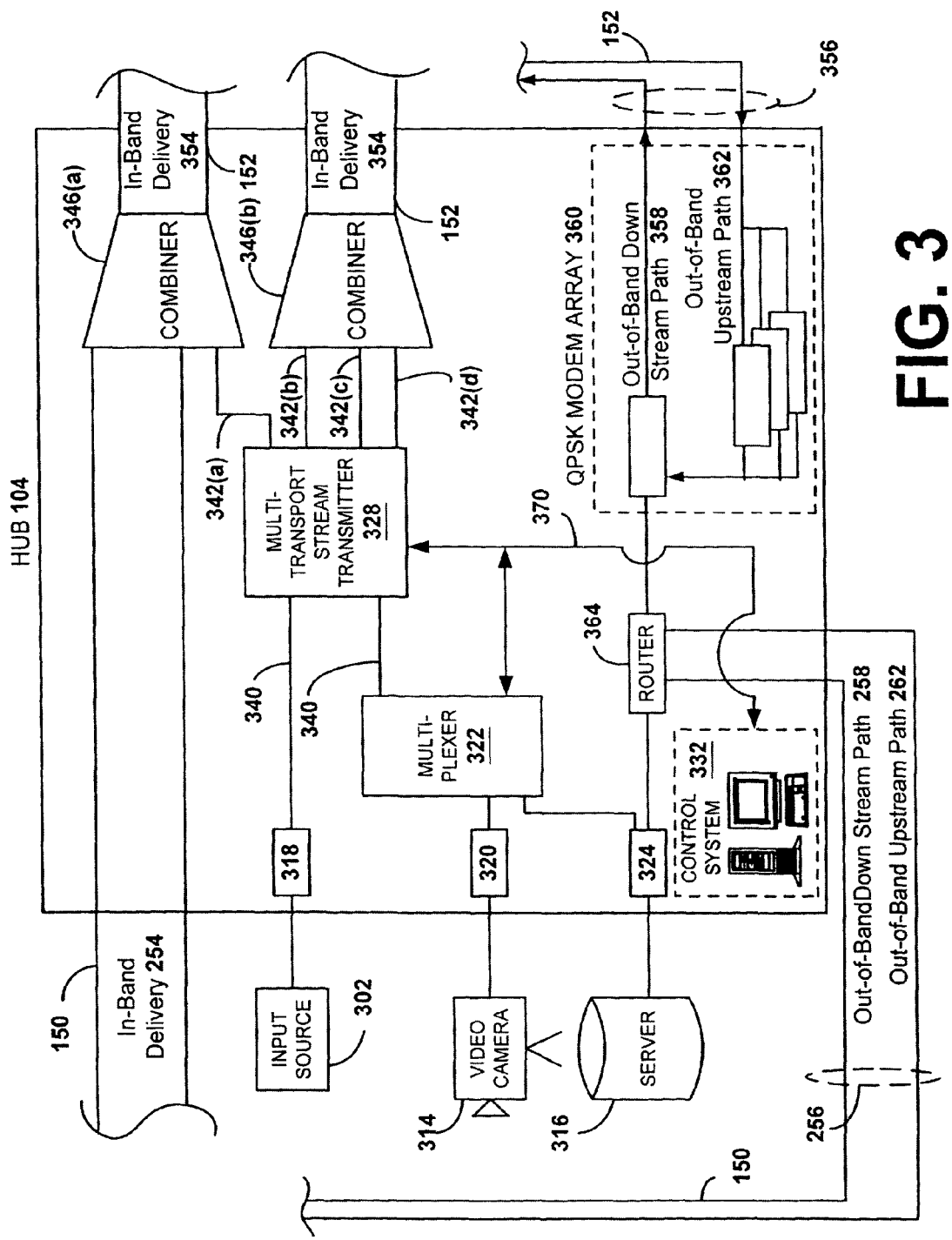
FIG. 3 is a hub in the broadband communication system in which the preferred embodiment of the invention may be employed.

Referring now to FIG. 3, the hub 104, which is remotely located from the headend 102, provides programming to the DHCTs 110 in a sub-region of the DBDS 100. The hub 104 receives programming and data from the headend 102 via the in-band delivery path 254 and the out-of-band delivery path 256 of transmission medium 150. In addition, the hub 104 can receive or provide programming from a variety of sources, such as, but not limited to, an additional input source 302, a video camera 314, or a sub-region application server 316.

The hub 104 functions as a mini-headend and includes many of the same elements as the headend 102. The hub 104 includes a controller 332 that controls elements, such as multi-transport stream controller 328, of hub 104. The controller 332 provides instructions to the elements of hub 104 through communication link 370. The hub 104 also includes a receiver 318 that is associated with input source 302. MPEG encoders, such as encoder 320, are included for encoding such things as local programming or a video camera 314 feed. Some of the signals may require additional processing, such as signal multiplexing prior to being modulated. Such multiplexing is done by multiplexer 322.

A switch, such as ATM switch, 324 provides access to the sub-region application server 316. There can be multiple sub-region application servers 316 providing a variety of services such as a Pay-Per-View service, a data service, an Internet service, a network system, or a telephone system. Content providers 114 (shown in FIG. 1) may download content to a sub-region application server 316 via transmission medium 150. The data information and programming of the sub-region associated with a hub 104 may be orientated to the demographics of the sub-region. This sub-region segmentation of the subscriber television system allows for much localized data information and programming such as a neighborhood channel or direct advertising to a specific market segment.

The data information and programming for the sub-region are then combined with the other information specific to the DBDS 100, such as data information and programming from headend 102. The hub 104 also contains a multi-transport stream controller 328, which receives a plurality of transport streams 340 and transmits a plurality of transport streams 342. In the preferred embodiment, the multi-transport stream controller 328 includes a plurality of modulators, such as, but not limited to, QAM modulators, that convert content of the received transport streams into modulated output signals. The modulated output signals, transport streams 342, are combined using equipment such as combiners 346, for input into transmission medium 152. The combined signals are sent to subscriber locations 108 via the in-band delivery path 354. Out-of-band data is transmitted to the transmission medium 152 by means such as, but not limited to, Quadrature Phase-Shift Keying (QPSK) modem array 360 via out-of-band downstream path 362. The out-of-band data is transmitted via the out-of-band downstream path 358 of transmission medium 152 by the Quadrature Phase-Shift Keying (QPSK) modem array 360. Two-way communication utilizes the out-of band upstream path 362 of the out-of-band delivery path 356. The received out-of-band information is routed through router 364 to headend 102 and application servers 316. Router 364 provides the interface between hub 104 and headend 102 for out-of-band control information. The out-of-band data is routed to the router 364. Router 364 provides the link between headend 102 and the DHCTs 110 in the sub-region for out-of-band data. In another embodiment, the hub 104 includes a control system that controls the devices in the hub 104 and interfaces with the headend 102 and with the DHCTs 110 connected to the hub 104.

The transmission medium 152 distributes signals from the hub 104 to subscriber locations 108 (shown in FIG. 1) via nodes 106 (shown in FIG. 1). The transmission medium 152 or 154 can incorporate one or more of a variety of media, such as optical fiber, coaxial cable, hybrid fiber-coax, satellite, direct broadcast, or other transmission media. An example of a DBDS 100 incorporating multiple varieties of media would be the transmission media referred to as hybrid fiber-coax that includes a transmission medium 150 incorporating fiber-optical cabling and a transmission medium 154 incorporating coaxial cabling. An alternative example of a DBDS 100 incorporating multiple varieties of media includes a transmission medium 150 incorporating fiber-optical cabling from the head end 102 to the node 106 and incorporating coaxial cabling from the node 106 to the subscriber location 108.

With multiple places to introduce data information and programming, the control system 232 (shown in FIG. 2) for the DBDS 100 must coordinate and control the services and programming available to each DHCT 110. A service group defines a group of DHCTs that receive data information and programming from the same modulators. Therefore, the same data information and programming are available to all the DHCTs in a service group, even if some subscribers do not subscribe to the same data information and programming.

In DBDS 100 there are many devices that receive and transmit transport streams, such as, but not limited to, the multi-transport stream transmitters 228 and 328 and receivers 218. The present invention shall be described as being embodied in the multi-transport stream transmitter 328, but this is for illustrative purposes only, and is a non-limiting example. The present invention can be implemented in any device that transmits a transport stream, such as for example, but not limited to, multi-transport stream transmitters 228 and 328, receiver 218, and server 216, or in an alternative embodiment of the present invention can be implemented in a device, such as the system controller 232 or 332, that controls a device that transmits a transport stream.

The logic of the present invention can be implemented in hardware, software, firmware, or a combination thereof. In the preferred embodiment, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figures 4, 6:
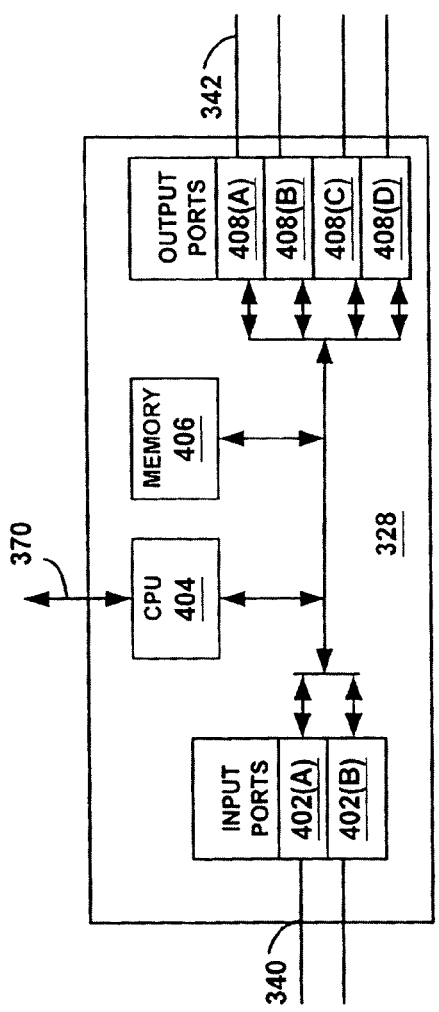
FIG. 4 is a block diagram of a multi-transport stream transmitter.
FIG. 6 is a table representing sessions.

Referring now to FIG. 4, multi-transport stream transmitter 328 receives two input transport streams 340 and transmits 4 output transport streams 342. The number of input and output transport streams is a matter of implementation; for example, the multi-transport stream controller 228, which is located in the headend 104, is adapted to receive four transport streams 240 and output eight transport streams 242. The multi-transport stream transmitter 328 includes a plurality of input ports 402, a processor 404, a memory 406 and a plurality of output ports 408.

The input and output transport streams 340 and 342, respectively, can be any digital transport stream, but will be described hereinbelow as MPEG transport streams. The present invention is not limited to MPEG transport streams, and the use of MPEG transport streams is for illustrative purposes only and is a non-limiting example of a digital transport stream.

In the preferred embodiment, the logic necessary for implementing the present invention resides in the processor 404 and in the memory 406. The processor 404 and the memory 406 include all the logic necessary to receive transport streams, create system specific tables, such as PATs and PMTs, and transmit transport steams. The processor 404 and the memory 406 also include all of the logic necessary to receive and implement session messages from the controller 332. Session messages are used to initiate and delete sessions for subscribers of the DBDS 100. A session message typically includes an input program number, an output program number, an input transport stream and an output transport stream. Typically, the session message also includes an indicator on whether the session is to be initiated or deleted.

In an alternative embodiment, the logic of the present invention resides in a controller, such as the system controller 232 or subregion controller 332, which controls multi-transport stream transmitter 328. When the logic resides in a controller external to the multi-transport stream transmitter 328, instructions are received by the processor 404 through communication link 370, which links the multi-transport stream transmitter 328 to the external controlling device.

The memory 406 includes tables that are used by the processor 404 for initiating, controlling and deleting sessions. The tables included in the memory 406 include at least a PID allocation map, a session number map and a session table, details of, which shall be provided hereinbelow.

Figure 5:
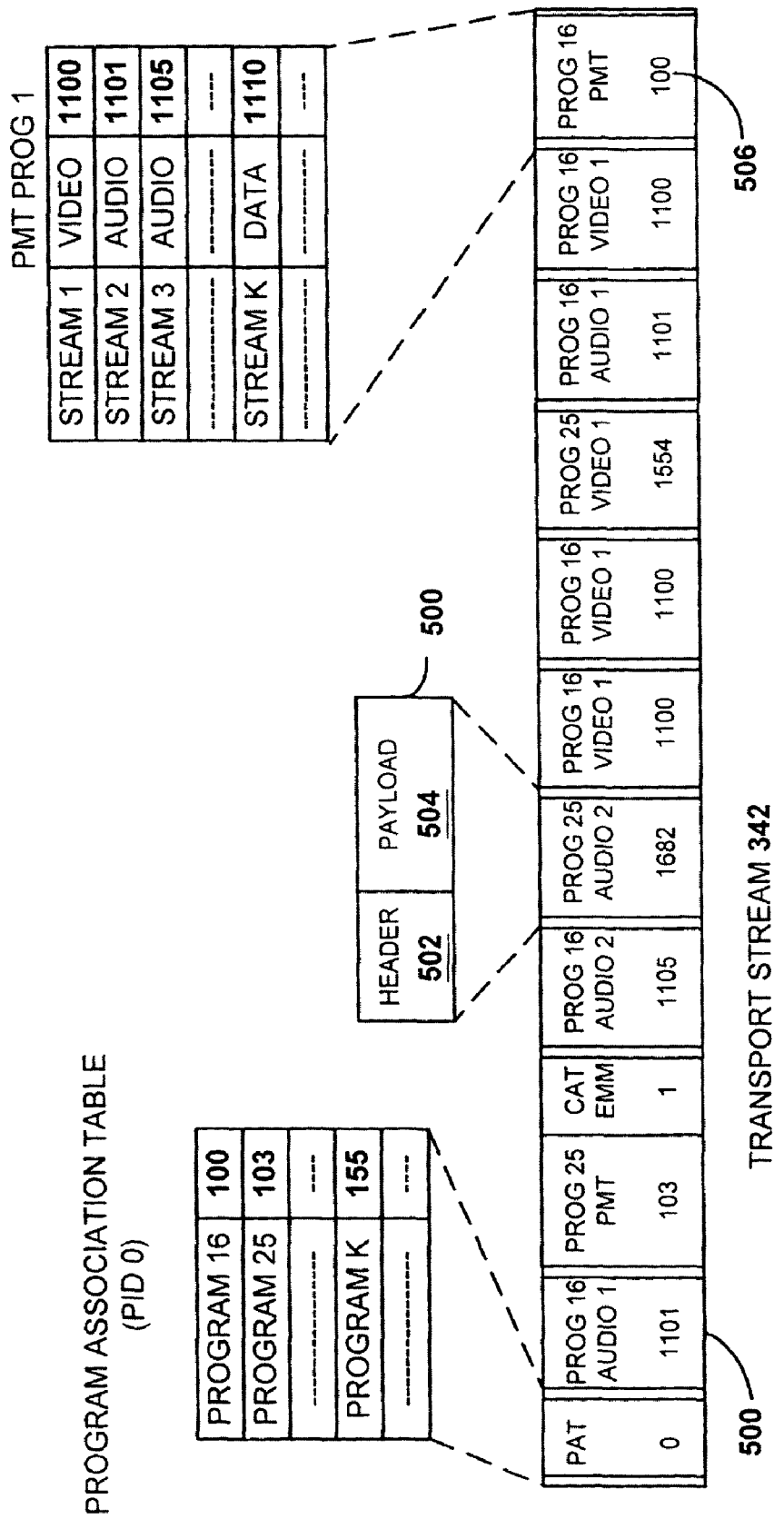
FIG. 5 is a block diagram representation of an MPEG transport stream and packets therein.

Referring now to FIG. 5, for the sake of clarity a brief description of transport stream 342 is provided hereinbelow. Transport stream 342 is made up of a plurality of MPEG packets 500. Each of the MPEG packets 500 has a header 502 and a payload 504. The header 502 includes a packet identifier (PID) 506 that is used to identify the packet. Certain packets, such as program association tables (PATs), which are identified by the PID value of 0, have reserved PID values. PATs are used to associate programs with program map tables (PMTs), which are used to identify the PID values of the elementary streams of the programs. For example, the exemplary PAT shown in FIG. 5, associates a program number 16 with a PMT packet having a PID value of 100. Generally, a program is made up of a plurality of elementary streams, and each of the elementary streams has a unique PID values associated with it in transport stream 342. The exemplary PMT shown in FIG. 5 lists the elementary streams and their respective PID values. Further details regarding MPEG transport streams can be found in U.S. application Ser. No. 09/845,510, "System And Method For Multicasting Packets In A Subscriber Network," filed on Apr. 30, 2001, which is hereby incorporated in its entirety by reference.

Referring now to FIG. 6, the session table 600 is used by the processor 404 for, among other things, keeping track of the sessions in which programming is being transmitted from the multi-transport stream transmitter 328. Each row in session table 600 represents a session. Each session associates an input port 402 (column 602) and an input program number (column 604) with an output port 408 (column 606) and an output program number (column 608). The session table 600 also includes for each session a session index (column 610), which is associated with the output port 408 of the session.

The input program number 604 identifies a program of the input transport stream 340, and the output program number 608 identifies the program in the output transport stream 342. The input and output program numbers can be the same or different. For example, input port 402(A) receives a program, program number 1, and the program is transmitted from output port 408(A) as program number 16 and as program number 1 in output port 408(A). In the preferred embodiment, the output program number 606 for a program of an output port 408 is included in the session message that initiated the session from the output port 408. For example, a first session message indicated program number 1 received in input port 402(A) is for transmission from output port 408(A) with the program number of 16, and another session message indicated that the same program is for transmission from output port 408(B) with the program number 1. In another embodiment, the multi-transport stream transmitter 328 includes logic for assigning unique program numbers to each program of an output transport stream 342. It should be emphasized that a program number should not be confused with a session number.

The session table 600 also includes the input PMT_PID (column 612) and the output PMT_PID (column 614) for each program that is transmitted from the multi-transport stream controller 328. The input PMT_PID is the PID value used for identifying received PMT packets of a program, and the output PMT_PID is the PID value used for identifying the transmitted PMT packets of the program. For example, the PMT packets of program number 1, which is received in input port 402(A), has a PID value of 16, and the PMT packet for the program, which is transmitted through output port 408 (A), has the PID value of 100. In the preferred embodiment, the output PMT_PID 614 is related to the session index 610. The details by which the output PMT_PID 614 is related to the session index 610 shall be provided hereinbelow.

The session table 600 also includes an ECM_PID 616, which identifies the packets of entitlement control messages (ECM) for a program. The ECM packets for a program include decryption information for the program. In the preferred embodiment, the ECM_PIDs 616 are associated with the output PMT_PIDs 614.

The PID pointer 618 of session table 600 points to the location of the memory 406 where the output PID values for the elementary streams of a program are stored. As will be explained in detail hereinbelow, the processor 404 uses the PID pointer 618 when starting a second session, a multi-cast session, of a program.

Referring to FIG. 7, the session number map 700 is used by the processor 404 for among other things, determining the active sessions for each output transport stream 342 transmitted from an output port 408. In an embodiment, there are 500 sessions associated with each output port 408 in session number map 700. The number of sessions is scalable and is a predetermined value that is determined by the operator of the DBDS 100. The state of each session number is either assigned or free (unassigned). Initially all of the session numbers are free (F), or unassigned, and then as sessions are started, they are assigned. The state of a session number changes from assigned (A) to free (F) when that session ends.

Referring now to FIG. 8, the PID allocation map 800 is used by the processor 404 for, among other things, assigning PID values to output elementary streams. The PID allocation map 800 includes system reserved PIDs 802, PMT_PIDs 804, ECM_PIDs 806 and allocable PIDs 808. In the preferred embodiment, the number of system reserved PIDs 802, the number of PMT_PIDs 804 and ECM_PIDs 806 are scalable, with the constraint that the total number of PIDs be 8,192, or be no more than the maximum number of PIDs allowed in the output digital transport stream 342.

The system reserved PIDs 802 are reserved for identifying system management and control packets such as, but not limited to, PATs and stuffing packets, that are included in output transport stream 342. The operator of DBDS 100 determines the number of PIDs to reserve for system management and control. In the preferred embodiment, the operator reserves a predetermined number of PMT_PIDs 804 and a corresponding number of ECM_PIDs 806. Each PMT_PID 804 is associated with a corresponding ECM_PID 806. For example, the PMT_PID 100 is associated with the ECM_PID 600. A PMT_PID and an ECM_PID form a pair of PIDs that are associated with a session number. For example, session number one is associated with PMT_PID 100 and ECM_PID 600.

The allocable PIDs 808 are all of the remaining PIDs that are not reserved. The allocable PIDs 808 are assigned to elementary streams of programs or other content provided to a subscriber. When a PID value is assigned to an output elementary stream from a given output port 408, the PID value is flagged as assigned (A), and it is flagged as free (F), or unassigned, when it is not assigned. The processor 404 checks the allocable PIDs 808 for free PIDs when initiating a session. For example, the PID value 1,100 has not been assigned to any elementary stream from output port 408(D), and consequently, it can be assigned to an elementary stream transmitted through output port 408(D). In an alternative embodiment, instead of having an array associated with each output port, the PID allocation map is a single array that associates PID values across all output ports 408. When a PID value, which is an allocable PID value 808, is assigned to an elementary stream in any of the output transport streams, that PID value cannot be assigned to a different elementary stream.

Figures 9, 11:
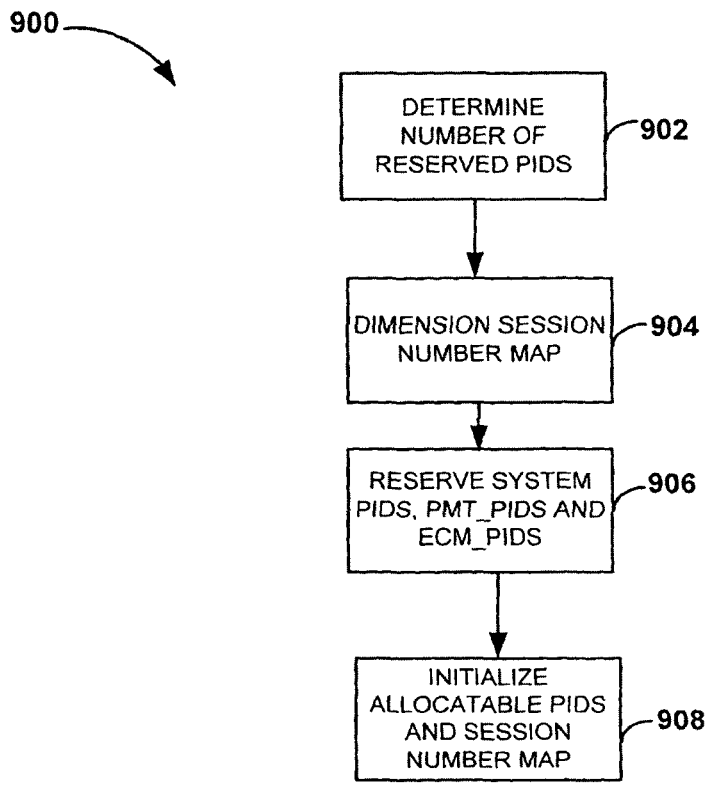
FIG. 9 is a flowchart of a method for initializing tables.
FIG. 11 is a block diagram of a message for creating a session.

Referring now to FIG. 9, in the preferred embodiment, the session table 600, the session number map 700 and the PID allocation map 800 are initialized according to steps 900. In step 902, the operator of the DBDS 100 determines the number of PIDs that should be reserved for identifying packets such as system and control packets, for example: PATs, stuffing packets and conditional access tables, packets that are used to entitlements to subscriber's DHCTs 110. The number of system and control PIDs, $N_{SYS}$, reserved by the operator is an operating parameter, which in the preferred embodiment is a scalable parameter. The operator also determines the maximum number of sessions, Ns for each output port. In the preferred embodiment, Ns is a scalable system parameter, which is also used for defining the number of PMT_PIDs and ECM_PIDs that are reserved. In an embodiment, each session has a pair of PIDs (PMT_PID, ECM_PID), associated with it.

In step 904, the session number map 700 is dimensioned to have an array of length Ns associated with each of the output ports 408 of the multi-transport stream transmitter 328, thus, the session number map 700 for the multi-transport stream transmitter 328 has 4 arrays. All of the array elements of the session number map 700 are initialized as free, or unassigned.

In step 906, the PIDs of the PID allocation map are reserved. In one embodiment, the PID allocation map 800 is dimensioned to have an array of length $N_{MAX}$ for each output port 408 of the multi-transport stream transmitter, where $N_{MAX}$ is the maximum number of PIDs in a transport stream from the multi-transport stream transmitter 328, such as 8,192 in an MPEG transport stream. In an alternative embodiment, the PID allocation map is dimensioned to a single array of length $N_{MAX}$, and the single array is associated with all of the output ports of multi-transport stream transmitter 328. The processor 404 reserves $N_{SYS}$ PIDs for the system reserved PIDs 802. The reserved system PIDs may or may not have contiguous PID values; for example, in an MPEG transport stream the PID=0 and the PID=8,191 must be reserved for system packets, and therefore, the system reserved PIDs 802 will not be contiguous.

The processor 404 also reserves PMT_PIDs 804 andqj ECM_PIDs 806. The manner in which the processor reserves PIDs in the PID allocation map 800 is a implementation. For example, the processor 404 can reserve a first block of PIDs for PMT_PIDs and a second block of equal length, for ECM_PIDs. In another, non-limiting, embodiment, the processor 404 reserves PMT_PIDs and ECM_PIDs as pairs of PIDs, which may or may not have contiguous values. In yet another embodiment, the processor 404 only reserves PIDs for the PMT_PIDs 804, and the reserved PID values for the PMT_PIDs 804 can be reserved as a block or in a predetermined distribution.

In step 908, the processor 404 determines which array elements of PID allocation map 800 are allocable, i.e., not reserved. All of the allocable PIDs 808 are initialized as free (F), or unassigned, i.e., not assigned to an output elementary stream. When an allocable PID is assigned to an output elementary stream, the state of the array element associated with the output port 408 transmitting the elementary stream having the allocable PID value is changed from free to assigned. For example, referring to FIG. 8, PID number 1100 is currently assigned to an elementary stream or streams transmitted from output ports 408(A), 408(B) and 408(C). It is important to note the elementary stream(s) transmitted from output ports 408(A), 408(B) and 408(C) having the PID value 1100 may or may not be the same elementary stream. The state of an allocable PID changes back to free when it is no longer assigned to an elementary stream.

In step 908, the processor 404 also initializes the state of all of the array elements of the session number map to free. After the PID allocation map 700 and the session number map 800 have been initialized, the multi-transport stream transmitter 328 is ready to have sessions created.

Figure 10:
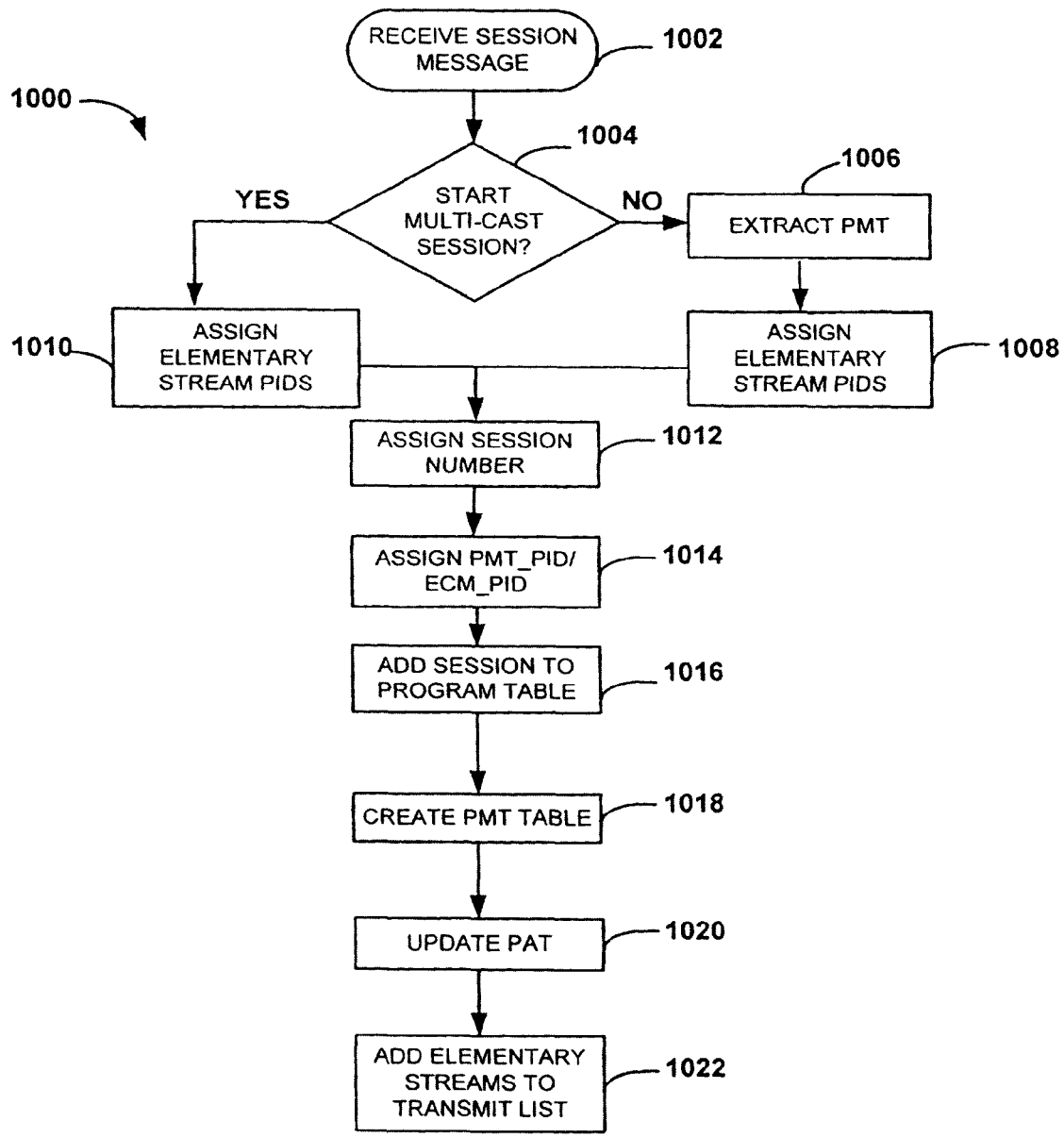
FIG. 10 is a flowchart of a method for starting a session.

Referring now to FIG. 10, the multi-transport stream controller 328, or a controller 332 that includes the necessary logic, implements step 1000. In step 1002, the multi-transport stream controller 328 receives a create session message 1100, which is shown in FIG. 11. In the preferred embodiment, the session message 1100 includes an add/delete field 1102, an input port field 1104, an input program number field 1106, an output port field 1108, an output program number field 1110 and a data field 1112. The add/delete field 1102 indicates whether the multi-transport stream transmitter 328 is to create a session or end, or drop, a session. Together the input port field 1104 and program number field 1106 indicate which program is to be added to an output stream or dropped from an output transport stream. The output port field 1108 identifies the output port 408 through which the program is transmitted, and the program number field 1110 identifies the output program number of the program. Data field 1112 includes other information used by the multi-transport stream transmitter 328. Data field 1112 might indicate that the program is from a particular source, such as V-O-D server 216, and that programs from that source can use a particular PCR elementary stream.

In step 1004, the multi-transport stream transmitter 328 determines whether the new session that is to be created in response to the received session message 1100 is a multi-cast session. For the purposes of this disclosure, a multi-cast session is a session in which the programming of the session is transmitted from more than one output port 408. A regular session, or a uni-cast session, is a session in which the programming of the session is transmitted from only one output port 408.

In the preferred embodiment, the processor 404 uses the input port field 1104, the input program number field 1106 and the session table 600 for determining whether the new session is a multi-cast session. The processor 404 checks to see if any of the sessions represented in session table 600 have the same input port (column 602) and input program number (column 604) as the input port field 1104 and the input program number field 1108 of the session message 1100. If so, then the new session is a multi-cast session. For example, session message 1100 adds input program number 10, which is received through input port 402(A), to the transport stream transmitted from output port 408(A). Referring to FIG. 6, input program 10 of input port 402(A) already being transmitted from output port 408(D), thus, program 10 will be multi-cast from output ports 408(A) and 408(D), and the new session is a multi-cast session.

When the new session is not a multi-cast session, the processor 404 proceeds to step 1006 and extracts from the input transport stream 340 the PMT packet for the program associated with the program number. If the input transport stream 340 corresponds to the A/54 industry standard, the PID for the PMT packet associated with the program is 16 times the program number. Thus, the PID for the PMT associated with program 10 is 160. The processor 404 can also determine the PID value of the PMT by extracting the PAT (PID=0) of the input transport stream, and parsing the PAT to determine the PID value of the PMT associated with the program number of the received session message 1100. The processor 404 parses the PMT for the program and determines the PID values of all of the elementary streams of the program indicated by the session message 1100.

In step 1008, the processor 404 uses the PID allocation map 800 to assign allocable PIDs 808 to the elementary streams of the program. In the preferred embodiment, the number of allocable PIDs assigned to a program is no greater than the number of elementary streams included in the input PMT of the program. Thus, if an input PMT lists twelve elementary streams for a program, then the processor 404 assigns no more than twelve PIDs to the program, thereby conserving PID numbers. It should be noted that a program might be associated with elementary streams that are not assigned to it. For example, several programs might be associated with the same PCR elementary stream. The A/54 standard specifies that PCR packets for a program have the same PID value as the video packets of the program. In the preferred embodiment, several programs in a transport stream are associated with the same PCR stream. By associating more than one program with a common PCR stream, bandwidth is conserved in DBDS 100, because each program does not use its own PCR stream for synchronization. Rather, they share a PCR stream.

In an embodiment, the PID allocation map 800 associates an array of PID values with each output port 408. When a new session for a program that is transmitted from a particular output port is started, a set of PID values from the array associated with the particular output port is assigned to the session. The processor 404 changes the state of the array elements of PID allocation map 800 having the index values of the assigned PID values from free to assigned. In this embodiment, the set of PID values are associated with the session, and when the session ends, the state of the array elements corresponding to the set of assigned PID values is changed to free.

In the preferred embodiment, the processor 404 assigns the set of PID values to a new session based upon the lowest free PID values for the output port associated with the session, and the set of assigned PID values may or may not be contiguous. Those skilled in the art will recognize other methods for determining the set of PID values to be assigned to a new session; for example, assigning PID values in decreasing order, from highest to lowest. All such methods are intended to be within the scope of the present invention.

In another embodiment, the PID allocation map is a single array, which maps the assigned PID values across all of the output ports 408. When a PID value is assigned, that PID value cannot be assigned to any other elementary stream. In this embodiment, when a session is started, the allocated PID values can be thought as being assigned with the elementary streams of the program, instead of being assigned to the session. Thus, when the elementary streams are multi-cast through more than one output port 408, the elementary streams of the multi-cast program have the same set of assigned allocable PIDs. And, when a session of a multi-cast program is ended, the remaining sessions continue to the same set of allocable PIDs assigned to them.

In step 1012, the processor 404 determines the session number for the session being created by the received session message 1100. The processor 404 uses the session number map 700 with the output port field 1108 to determine the session number. In the preferred embodiment, the processor 404 determines the lowest free session number for the output port 408 and assigns the lowest free session number to the session. Thus, the very first session for a particular output port 408 that is created in multi-transport stream transmitter 328 is assigned the session number 1, and as long the first session is still active the next session for the same output port 408 is assigned session number 2. After a period of time the free session numbers may not be contiguous. For example, referring to FIG. 7, the session number 3 for output port 402(B) is free even though session number 4 is currently assigned. This came about because session number 4 was assigned to a session while session number 3 was assigned to a different session, and afterwards the session for session number 3 was ended. When session ends, the session number that was assigned to that session is flagged as free and can consequently be reassigned to a new session. Those skilled in the art will recognize other methods for determining the session number to be assigned to a new session; for example, assigning session numbers in decreasing order, from highest to lowest. All such methods are intended to be within the scope of the present invention.

In step 1014, the processor 404 uses the session number for determining the output PMT_PID value 614. In one embodiment, session number 1 is associated with the first output PMT_PID value of the reserved PMT_PIDs and the session numbers and the PMT_PID values are sequentially associated. For example, session number 1 is associated with PMT_PID value 100, session number 2 is associated with PMT_PID value 101, and so on and so forth. In an alternative embodiment, the PMT_PID values are distributed according to a predetermined scheme. For example, in one embodiment, the first PMT_PID value, which is associated with session number 1, has a value of 510, and subsequent PMT_PIDs, which are associated with subsequent session numbers, are offset from the first PMT_PID by a predetermined amount, such as 8. Thus, the session number 2 is associated with the PMT_PID having the value of 518. The manner in which the PMT_PIDs are related to the session numbers is a matter of implementation, and those skilled in the art will recognize many methods, all of which are intended to be within the scope of the present invention, for relating the PMT_PIDs to the session numbers. By associating the PMT_PIDs to the session numbers, the processor 404 does not have to check the PID allocation map 800 in order to assign the PMT_PID to a program. Each reserved PMT_PID value is associated with only one session number, and a session number cannot be assigned to more than one session per output port 408. Thus, there are no PMT_PID conflicts in the output transport streams. A PID conflict occurs when two or more elementary streams have the same PID values in the same transport stream.

In step 1016, the processor 404 updates the session table 600 to include the session that was created in response to the received session message 1100. In one embodiment, the session table 600 includes a PID pointer 618, which points to the location in the memory where the set of allocable PID values for the elementary streams of the program are stored. In this embodiment, all of the elementary streams of multi-cast sessions have the same set of PID values.

In step 1018, the processor 404 creates an output PMT packet for the program of the new session. The PMT packet associates the elementary streams, video, audio, etc., of the program with the set of allocable PID values that have been assigned to the output elementary streams.

Next, the processor 404 proceeds to step 1020 and updates the PAT that is transmitted from the output port 408 identified by the output port field 1108 of session message 1100. For example, in response to the session message 1100, the processor 404 includes program number 510 in the PAT transmitted from output port 408(A).

In step 1022, the processor 404 turns on data flow control for elementary streams of the program, such that the elementary streams are transmitted from the particular output port 408 identified by the output port field 1108 of the session message 1100. Data flow enables the received elementary streams to be routed to their respective output ports 408 and have their PID values be mapped to their assigned set of allocable PID values. The processor 404 also includes the new PMT in the transport stream that is transmitted from the identified output port 408.

Referring again to step 1004, when the new session is the start of a multi-cast session, the processor 404 proceeds to step 1010. In the preferred embodiment, the processor already knows the input PID values of the program stream for the new session, because the PMT for the program stream has already been parsed. However, if the information is not available, the processor gets the PMT for the program and parses the PMT to determine the elementary streams of the program.

In an embodiment, the processor 404 uses the output port field 1108 of the session message 1100 and the PID allocation map 800 to determine the set of allocable PIDs for the elementary streams for the new session. In this embodiment, the processor 404 determines which array of PID allocation map is associated with the output port 408 identified by the output port field 1108 and assigns a set of allocable PIDs based upon which the allocable PIDs 808 are free. The processor 404 then changes the state of the elements having the index values that correspond to the assigned set of PID values of that array from free to assigned.

In another embodiment, the PID allocation map 800 is a single array that maps the find PIDs across all of the output ports. In which case, the elementary streams of the program for the new session, which is now a multi-cast program, will use the set of allocable PIDs that were assigned to other sessions of the program. The processor 404 determines which session in session table 600 is currently associated with the program of the new session. The processor 404 then checks the PID pointer 618 of session table 600 to determine the location in the memory 406 where the PID values for the elementary streams are stored. For example, session message 1100 indicates that input program number 10 received through input port 402(A) is transmitted from output port 408(A). However, using session table 600 the processor determines that input program 10 is currently being transmitted through output port 408(D), and that the output PID values for elementary streams of input program 10 are stored in memory location 512. The processor 404 then retrieves the set of assigned PID values and uses them to identify the elementary streams of the program for the new session through output port 408(A).

Figure 12:
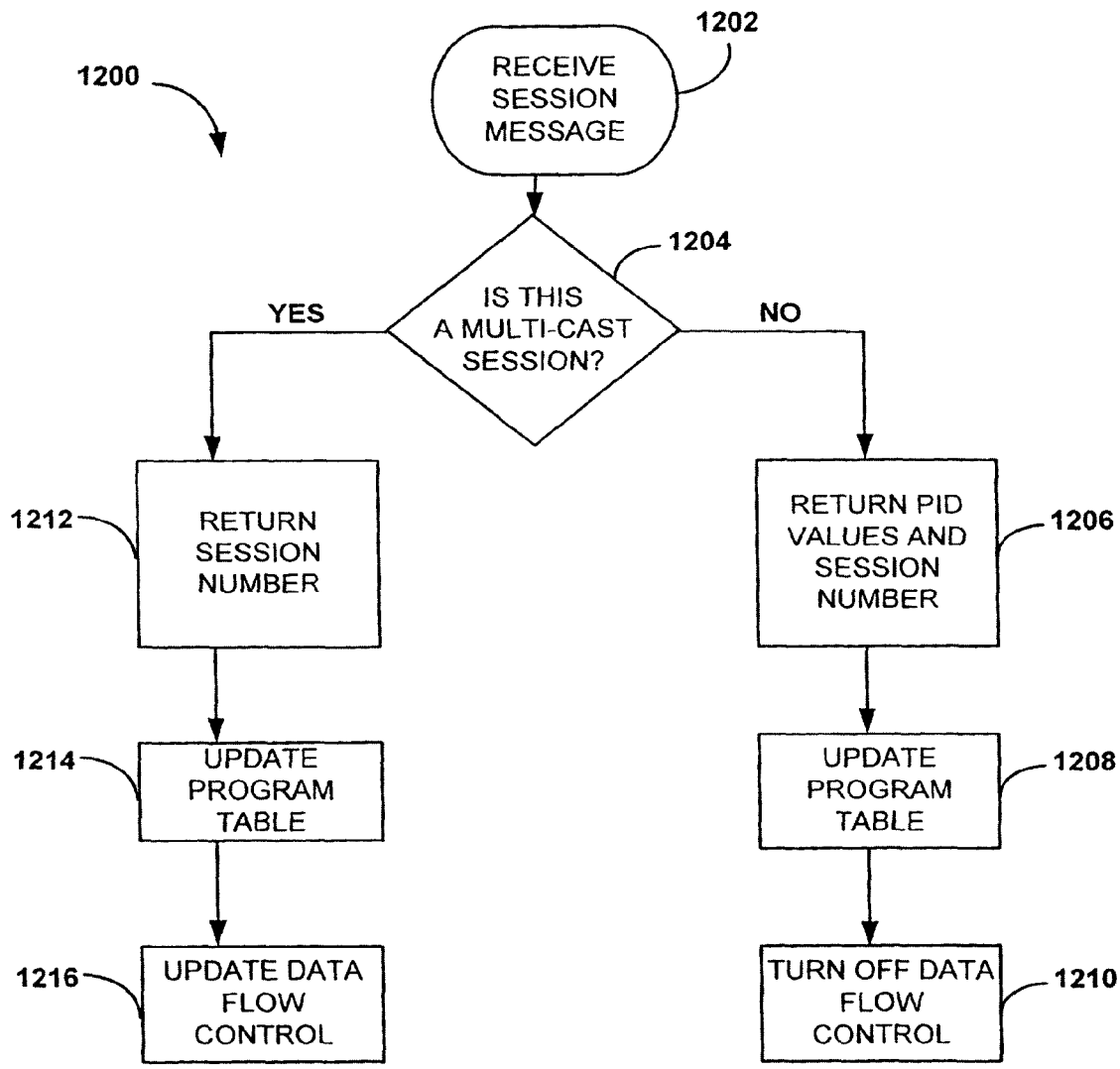
FIG. 12 is a flowchart of a method for ending a session.

Referring now to FIG. 12, steps 1200 are implemented by the processor 404, or by a controller, such as subregion controller 332, that controls multi-transport stream transmitter 328, to end a session.

In step 1202, the processor 404 receives a drop session message that indicates that a current session is to be ended. In which case, the add/delete field 1102 of session message 1100 would indicate "drop" instead of "add". The processor 404 reads the session message 1100 to determine the input program number, the input port 402, the output program number and the output port 408 of the session.

In step 1204, the processor searches the session table 600 for at least two sessions having the same input program number and input port 402 as indicated by the received drop session message. If the processor 404 finds at least two matches, then the session is a multi-cast session, and the processor 404 proceeds to step 1212. On the other hand, if the session is a uni-cast session, the processor proceeds to step 1206.

In step 1206, the processor 404 determines the set of allocable PID values that have been assigned to the uni-cast session, and changes the PID allocation map 800 to indicate that those PID values are free.

In the embodiment in which the PID allocation map 800 has an array associated with each output port 408, the processor 404, first determines the particular array that is associated with the output port identified in the drop session message. Next, the processor 404 changes the state of the array elements that have index values that correspond to the set of allocable PID values for the dropped session from allocated to free. Thus, the PID values can be reassigned to another new session.

In the embodiment in which the PID allocation map is a single array, the processor 404 changes the state of the array elements that have index values corresponding to the set of allocable PID values for the dropped session.

The processor 404 also uses the session table 600 to determine the session index 610 and the output port 408 for the dropped session. Then, the processor 404 determines the particular array of the session number map 700 that is associated with the output port 408 of the dropped session, and changes the state of the array element having the session index value from assigned to free. For example, referring to session table 600 and session number map 700, if the drop session message indicated that program number 1 received through input port 402(A) was to be dropped from output port 408(A), then using the session table map 600 the session index 610 for the dropped session has the value of 1, and session number 1 associated with the output port 408(A) in the session number map 700 would be changed from assigned to free.

In step 1208, the processor 404 updates the session table 600 by removing all of the information about the dropped session from the session table 600. The processor also updates the PAT that is transmitted through the output port 408 of the dropped session by deleting the output program number and its associated PMT_PID from the PAT. Thus, the session table 600 and the PAT reflect the current status of sessions.

Next in step 1210, the processor 404 turns off data flow control of the elementary streams of the dropped session. After which, the elementary streams of the deleted session are no longer transmitted.

Referring back to step 1204, if the session to be ended is a multi-cast session, the processor 404 proceeds to step 1212. In step 1212, the processor 404 uses the session table 600 and the information contained in the received drop session message to determine the session index 610 for the session and the output port 408. The processor 404 then updates the session map 700 to indicate that the session number for that output port is free.

In the embodiment in which the PID allocation map 800 has one array associated with each output port 408, the processor also determines the particular array that is associated with the output port 408 identified in the drop session message and determines the set of allocable PID values that are assigned to the session. Next, the processor 404 changes the state of the array elements that have index values corresponding to the set of allocable PID values from "assigned" to "free". If, on the other hand, the PID allocation map 800 is a single array, then the state of the array elements are not changed, because the PID values are still assigned to active sessions.

In step 1214, the processor 404 updates the session table 600 by deleting the information related to the dropped session from the session table 600. The processor 404 also updates the PAT that is transmitted through the output port 408 identified by the drop session message. The PAT is updated such that it no longer lists the program of the deleted session.

In step 1216, the processor 404 updates the data flow control of the elementary streams, such that the elementary streams that are associated with the dropped session are no longer transmitted from the particular output port identified by the drop session message. However, the dropped session was a multi-cast session, and therefore, the elementary streams for the program continue to be transmitted from output ports 408 of the other sessions.

Again, it should be noted that the PMT_PIDs are associated with session numbers and not with input or output program numbers. Thus, the PMTs for a multicast program will be identified by different PID values, unless the multi-cast program happens to have the same session number. Furthermore, unlike the A/54 standard where the number of sessions is limited to no more than 255 sessions, the number of sessions in the present invention is scalable. In an embodiment, the ECM_PIDs are not reserved. Instead, the PID values for the ECM packets are assigned from the pool of allocable PID values 808. Generally, not every session is going to require encryption, in which case, PID numbers are conserved by assigning ECM_PIDs only to those sessions/programs that require them.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of allocating program identifier (PID) values to a program in a digital transport stream, the digital transport stream including at least one program including a plurality of elementary streams, the method comprising the steps of:

(a) assigning a session number to a session, wherein the session is associated with a program having a plurality of elementary streams;

(b) associating a program map table (PMT)_PID value with the session number;

(c) assigning a set of PID values to the elementary streams of the program; and (d) indicating in a map of allocable PID values the assigned PID values; and prior to the steps of (a), (b), (c) and (d), receiving a session message having a program identifier included therein, wherein in response to the session message, steps (a), (b) and (c) are implemented to assign a first session number to a first session that is associated with a first program identified by the program identifier, associate a first PMT_PID value to the first session number and assign a first set of PID values to the elementary streams of the first program; and after steps of (a), (b) and (c), further including the step of: transmitting from a device the elementary streams of the first program in a digital transport stream, wherein the device that transmits the first program has a plurality of output ports that are adapted to transmit digital transport streams, and the session message further includes an output port identifier that identifies the output port of the plurality of output ports from which the elementary streams of the first program are transmitted.

2. The method of claim 1, further including the step of: associating the session number with an output port, wherein the program that is associated with the session is transmitted from the output port.

3. The method of claim 1, prior to step (a), further including the step of: determining from a map of session numbers an unassigned session number, wherein the unassigned session number is the session number assigned to the session in step (a).

4. The method of claim 3, wherein the map of session numbers is an array of elements, each element of the array is associated with a session number and has an unassigned state and an assigned state; and further including the step of:

when the session number is assigned to the session, indicating the state of the element that is associated with the session number as assigned.

5. The method of claim 4, wherein the elements of the array are checked based upon their index values in the array, and the element having the lowest index value and an unassigned state is assigned to the session.

6. The method of claim 3, wherein the map of session numbers is a plurality of arrays, each array of the plurality of arrays is associated with an output port.

7. The method of claim 1, wherein the first session is associated with the output port identified by the output port identifier.

8. The method of claim 7, further including the steps of: receiving a second session message having a second output port identifier and a second program indicator included therein, wherein the second program indicator identifies a second program, wherein the second output port identifier identifies an output port, and wherein in response to the second session message steps (a), (b) and (c) are implemented to assign a second session number to a second session that is associated with the second program, associate a second PMT_PID value to the second session number and assign a second set of PID values to the elementary streams of the second program; and transmitting from the output port identified by the second session message the elementary streams of the second program.

9. The method of claim 8, wherein the output port associated with the first session is different from the second output port, the first and second session numbers are the same, and the first and second PMT_PID values are the same.

10. The method of claim 8, wherein the first program and the second program are the same program, and the first and second set of PID values assigned to the elementary streams of the program are the same.

11. The method of claim 8, wherein the output port associated with the first session is the same as the second output port, and the numerical values of the first and second PMT_PID values are related to the numerical values of the first and second session numbers.

12. The method of claim 1, further including the steps of: allocating a first set of PID values for use as PMT_PIDs, wherein only PIDs from the first set of PID values are associated with PMT packets; and allocating a second set of PID values for assignment to elementary streams of programs, wherein only PIDs from the second set of PID values are assigned to elementary streams of a program.

13. The method of claim 1, further including the steps of: determining the number of elementary streams of the first program, wherein the number of PID values in the set of PID values assigned to the elementary streams of the program is less than or equal to the number of elementary streams of the first program.

14. An apparatus in a digital network that includes one or more transport streams each having a plurality of programs included therein, wherein a program is defined by a set of elementary streams, the apparatus comprising:

means for assigning a session number to a session, wherein a session is associated with a given program of the plurality of programs of a given transport stream of the one or more transport streams;

means for assigning a PMT_PID to the session; and means for allocating a set of PIDs to a set of elementary streams of the given program;

a plurality of output ports, each output port of the plurality of output ports adapted to transmit an output transport stream having at least one program of the plurality of programs, wherein each program transmitted from an output port is associated with a unique session number;

a first input port adapted to receive a session message having a program identifier and an output port identifier included therein, wherein the output port identifier identifies an output port of the plurality of output ports; and a second input port in communication with the plurality of output ports, the second input port adapted to receive a transport stream of the one or more transport streams having a plurality of programs included therein, wherein the plurality of programs includes a first program associated with the program identifier; and wherein the means for assigning a session number uses the session message to assign a session number for a further session associated with the identified output port, thereby including the first program in the transport stream transmitted from the identified output port.

15. The apparatus of claim 14, wherein the value of the PMT_PID assigned to the session is related to the session number of the session.

16. The apparatus of claim 14, wherein the number of PIDs in the set of allocated PIDs is no more than the number of elementary streams of the program.

17. The apparatus of claim 14, wherein the set of allocated PIDs have values that are not contiguous.

18. The apparatus of claim 14, wherein a first output port of the plurality of output ports transmits a first output transport stream, which includes a first program having a first program number associated therewith, a second output port of the plurality of output ports transmits a second output transport stream, which includes a second program having a second program number, which is different than the first program number, associated therewith, the first and second programs each having a PMT identified by a PMT_PID value associated therewith, and the first and the second PMTs have the same PMT_PID value.

19. The apparatus of claim 18, wherein the first and second programs are the same particular program, and the elementary streams of the particular program have the same PID values in the first and second transport stream.

20. The apparatus of claim 14, wherein a first output port of the plurality of output ports transmits a first output transport stream, which includes a first program having a program number associated therewith, a second output port of the plurality of output ports transmits a second output transport stream, which includes a second program having the program number associated therewith, the first and second programs each having a PMT identified by a PMT_PID value associated therewith, and the first and the second PMTs have the different PMT_PID values.

21. The apparatus of claim 20, wherein the first and second programs are the same particular program, and the elementary streams of the particular program have the same PID values in the first and second transport stream.

22. The apparatus of claim 14, wherein the means for assigning a session number includes a session number map.

23. The apparatus of claim 22, wherein the session number map is an array of elements having a first and second state, each element is associated with a session number, the first state representing an unassigned session number and the second state representing an assigned session number.

24. The apparatus of claim 23, wherein the means for assigning a session number searches the array of elements for an element in the first state and assigns the session number associated with that element to the session, and changes the state of that element of the array to the second state.

25. The apparatus of claim 23, wherein each element of the array is associated with a PMT_PID.

26. The apparatus of claim 14,
wherein the means for assigning session numbers includes a session number map, the session number map including a plurality of arrays, each array associated with an output port of the plurality of output ports.

27. The apparatus of claim 26, wherein each array of the plurality of arrays includes a plurality of elements, and each element is associated with a PMT_PID value.

28. The apparatus of claim 14, wherein the means for allocating a set of PID values includes a PID allocation map.

29. The apparatus of claim 28, wherein the PID allocation map includes an array of elements associated with PID numbers.

30. The apparatus of claim 28,
wherein the PID allocation map includes a plurality of arrays, each array of the plurality of arrays including a plurality of elements and each array is associated with an output port, each element of the plurality of elements is associated with PID numbers.

* * * * *